United States Patent [19]

Schardt et al.

[11] 3,995,914
[45] Dec. 7, 1976

[54] ROD AND GUIDE ASSEMBLY

[75] Inventors: Michael M. Schardt, Kettering; John T. Smith, Centerville, both of Ohio

[73] Assignee: General Motors Corporation, Detroit, Mich.

[22] Filed: Aug. 18, 1975

[21] Appl. No.: 605,413

[52] U.S. Cl. .................................. 308/3 R; 64/23
[51] Int. Cl.² .................................... F16C 17/00
[58] Field of Search .............. 308/3 R; 64/23 R, 9; 74/446; 403/359, 30; 29/159.2, 149.5 R, 149.5 C

[56] References Cited
UNITED STATES PATENTS 3,805,552  4/1974  Heald ........................... 308/3 R X

*Primary Examiner*—Robert R. Song
*Assistant Examiner*—Gene A. Church
*Attorney, Agent, or Firm*—D. D. McGraw

[57] ABSTRACT

A rod and guide assembly which permits free axial rod movement and does not allow the rod to rotate excessively in the rod guide. The rod is a cast member having a main body of circular cross section and a key integrally formed therewith and extending from and axially along one side of the main body. The parting line plane of the rod passes through the rod axis and substantially at right angles to a plane passing through the center of the key and the rod main body axis. The guide member has a guide aperture through which the rod extends. The aperture is defined by circumferentially spaced axially extending wall sections having circumferentially spaced and radially extending recesses therebetween. Two circumferentially opposite recesses have an axially extending plane passing therethrough and through the aperture axis. This plane is perpendicular to a similarly extending plane passing through at least one other such recess. At least portions of the wall sections circumferentially intermediate the recesses define bearing and guide surfaces for the rod main body and permit free axial rod movement in the aperture. The rod key is received in a recess lying in the plane which is perpendicular to the two circumferentially opposite recesses to position the rod in a circumferentially oriented position relative to the rod guide member. The rod key clears the recess walls for free axial rod movement, but with attempted rotation of the rod the key will engage one or the other of the side walls of the recess in which it is located to prevent any substantial rotational movement to maintain the circumferentially oriented position of the rod relative to the rod guide member. The plane of the rod parting line passes through the two circumferentially opposite recesses so that any flash or parting line mismatch on the main body of the rod lies in these recesses and cannot contact the guide member. This minimizes the possibility of the rod sticking or jamming due to parting line mismatch or flash interference.

1 Claim, 2 Drawing Figures

ROD AND GUIDE ASSEMBLY

The invention relates to a rod and guide assembly and more particularly to one which locates the rod and limits rod rotation relative to the guide member so that any parting line flash or mismatch resulting from the rod manufacture by casting will be located in recesses provided in the guide member and cannot contact the guide member, preventing the rod from sticking or jamming and being unable to freely move axially relative to the guide member.

An important use of the invention is found in a fluid level sensor mechanism with a float being attached to the rod so that the rod moves axially as an indication of fluid level in a reservoir. By providing this type of construction, the assembly may be made without the close tolerances otherwise required, and the rod may usually be employed as cast without any cleaning of parting line flash or correction of parting line mismatch. This results in an effective rod and guide assembly at a much more reasonable cost than would be the case if close tolerances were required. It also provides small bearing surface areas which results in the rod having less frictional force to overcome in the bearing and guide member, giving a more accurate and responsive movement to the rod, than would the case with the rod journaled in a bearing extending about its entire circumference and engageable with a large rod area.

IN THE DRAWING

Figure 1:
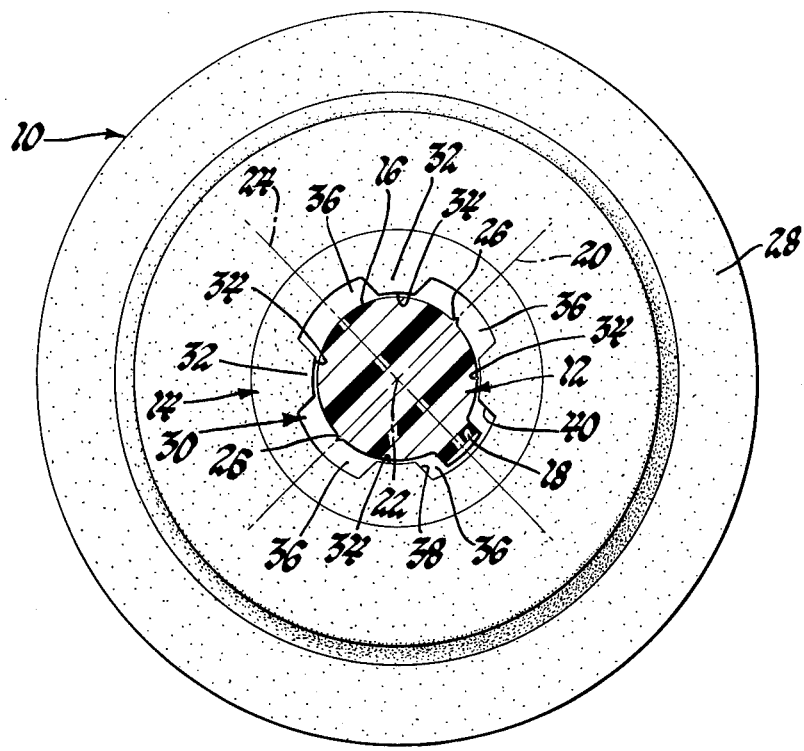
FIG. 1 is a plan view of the rod and guide assembly embodying the invention, with parts in section.
Figure 2:
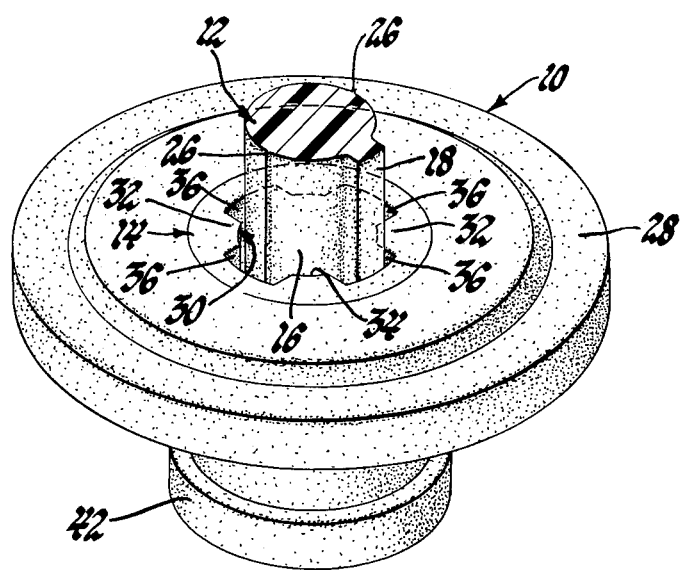
FIG. 2 is a perspective view of the assembly of FIG. 1, with a portion thereof being in section.

The assembly 10 includes a rod 12 and a bearing and guide member 14. The rod has a main body 16 which is preferably circular in cross section, but may have other acceptable uniform cross section shapes. If the rod is so construced, the bearing and guide aperture is constructed accordingly. However, the description of the preferred embodiment disclosed will relate to a rod having a circular main body and the bearing and guide member being made to accommodate the circular main body type rod. The rod has a key 18 integrally formed with the main body 16 and extending radially from and along one side thereof. The key is provided with appropriate draft so that the rod may be cast with the parting line plane 20 thereof extending through the rod axis 22 and substantially perpendicular to a plane 24 also extending through the rod axis 22 and passing through the center of the key 18. Thus any parting line flash or mismatch 26 which might occur in the casting process lies in the plane 20 and circumferentially at right angles from the center of the rod key 18.

The rod bearing and guide member 14 is illustrated as being installed in a fluid level sensor cover 28. The member 14 has a guide aperture 30 through which rod 12 extends and relative to which the rod is freely axially movable. The aperture 30 is defined by circumferentially spaced and axially extending wall sections 32, there being four such sections in the preferred embodiment illustrated, each wall section having at least portions thereof defining bearing and guide surfaces 34 for the rod main body. In the embodiment illustrated, walls 32 are arcuate portions of a cylinder. However, they may be formed in other manners such as flat surfaces located as chords, or convex surfaces presenting only substantially line contact with the rod main body at bearing and guide surfaces 34. The wall sections 32 have circumferentially spaced and radially and axially extending recesses 36 positioned therebetween. In the preferred embodiment shown, these recesses are equally spaced and are four in number. In practicing the invention, it is required that at least one of the recesses be within and preferably bisected by a radially and axially extending plane passing through the aperture axis. This axis is coincident with the rod axis 22 when the rod is centered in aperture 30. This plane is substantially perpendicular to a redially and axially extending plane which passes through the centers of two circumferentially opposite recesses. As shown in the drawing, these two planes are respectively coincident with plane 24, containing key 18, and the parting line plane 20 of the rod 12. The recess 36, in which key 18 is received, and which is bisected by plane 24, has side walls 38 and 40 which are normally spaced from key 18 but engageable by the key should the rod try to rotate in the aperture 30. The size of the key 18 relative to the size of the recess 36 will determine the amount of permissible arcuate play of the rod relative to the bearing and guide member. The amount of permissible movement is such that it is not substantial in terms of the requirements of the invention and the device in which it is employed, the limits of rod rotational movement maintaining a circumferentially-oriented position wherein any flash or parting line mismatch 26 on the rod main body lies in the circumferentially opposite recesses 36 through which plane 20 passes and cannot contact the bearing and guide member 14. This minimizes the possibility of the rod sticking or jamming when it should be moved, due to parting line mismatch or flash interference. Thus any mechanism moving the rod axially, such as a float 42 mounted on the lower end of rod 12, can move the rod freely and easily with sufficient sensitivity to any changes acting thereon to promptly reflect such changes as rod movement.

This construction and arrangement permits an assembly to be manufactured with sufficient tolerance to minimize expense while at the same time providing an effective mechanism. In particular, it permits the use of a cast rod which can have some parting line mismatch or flash without requiring the rod to be rejected during inspection operations or subjected to finishing operations. When utilized in a fluid level sensor such as that sometimes used in brake fluid reservoirs, the assembly is made of small, lightweight plastic parts which can be made inexpensively by obviating the requirement for extremely close tolerances.

What is claimed is:

1. For use in a mechanism having an axially movable rod, a rod and guide assembly comprising:

an axially extending and movable rod having a main body of uniform cross section and a key integrally formed with said main body and extending from and axially along one side thereof, said rod being cast with a parting line plane passing axially therethrough at substantially right angles to a plane passing through the center of said key and the axis of the rod main body;

and a rod guide member having a guide aperture through which said rod extends and relative to which said rod is axially movable, said aperture being defined by circumferentially spaced axially extending wall sections and having circumferentially spaced and radially and axially extending recesses therebetween, at least one of which is bisected by a radially and axially extending first plane lying perpendicular to a radially and axially extending second plane passing through two circumferentially opposite recesses, at least portions of said wall sections circumferentially intermediate said recesses defining bearing and guide surfaces for said rod main body for free axial rod movement in said aperture;

said rod key being received in one of said at least one of said recesses in a circumferentially oriented position relative to said rod guide member for free axial rod movement and engageable with either of the side walls of said one recess to prevent any substantial rod rotational movement to maintain said circumferentially oriented position, said rod parting line plane passing through said two circumferentially opposite recesses so that any flash or parting line mismatch on said main body lies therein and cannot contact said guide member, thereby minimizing the possibility of the rod sticking due to parting line mismatch or flash interference.

* * * * *